(12) United States Patent  
Lambert et al.

(10) Patent No.: US 8,745,703 B2  
(45) Date of Patent: Jun. 3, 2014

(54) IDENTIFYING EXPLOITATION OF VULNERABILITIES USING ERROR REPORT

(75) Inventors: John J. Lambert, Redmond, WA (US); Matthew W. Thomlinson, Seattle, WA (US); Alexander R. G. Lucas, Cheltenham (GB); James P. Kelly, Cheltenham (GB); David S. Carter, Cheltenham (GB); Matthew I. Diver, Cheltenham (GB); Emma L. Crowe, Cheltenham (GB)

(73) Assignee: Microsoft Corporation, Redmond, WA (US)

( * ) Notice: Subject to any disclaimer, the term of this patent is extended or adjusted under 35 U.S.C. 154(b) by 1325 days.

(21) Appl. No.: 12/144,694

(22) Filed: Jun. 24, 2008

(65) Prior Publication Data

US 2009/0320136 A1 Dec. 24, 2009

(51) Int. Cl.
*G06F 21/00* (2013.01)

(52) U.S. Cl.
USPC ............................................................. 726/5

(58) Field of Classification Search
CPC ......... G06F 21/00; G06F 21/50; G06F 21/55; G06F 21/554; G06F 21/56; G06F 2221/00; G06F 2221/2101
USPC ............................................................. 726/5
See application file for complete search history.

(56) References Cited

U.S. PATENT DOCUMENTS

| 5,111,384 | A | 5/1992 | Aslanian et al. |
| 5,790,777 | A | 8/1998 | Izuta et al. |
| 6,230,288 | B1 * | 5/2001 | Kuo et al. ................... 714/38.14 |
| 6,681,348 | B1 | 1/2004 | Vachon |
| 6,738,928 | B1 | 5/2004 | Brown |
| 7,028,056 | B1 | 4/2006 | Hendel et al. |
| 7,149,929 | B2 | 12/2006 | Chaurasia et al. |
| 7,191,364 | B2 | 3/2007 | Hudson et al. |
| 2002/0078397 | A1 * | 6/2002 | Qin ................................ 714/13 |
| 2004/0015712 | A1 * | 1/2004 | Szor ............................. 713/200 |
| 2004/0064736 | A1 * | 4/2004 | Obrecht et al. ............... 713/201 |
| 2005/0183143 | A1 * | 8/2005 | Anderholm et al. ............ 726/22 |
| 2005/0251854 | A1 * | 11/2005 | Shay ................................. 726/2 |
| 2006/0070130 | A1 * | 3/2006 | Costea et al. ................... 726/24 |
| 2006/0117048 | A1 * | 6/2006 | Thind et al. .................... 707/101 |
| 2006/0123244 | A1 * | 6/2006 | Gheorghescu et al. ....... 713/188 |

(Continued)

OTHER PUBLICATIONS

Newsom et al., ("Polygraph: Automatically Generating Signatures for Polymorphic Worms"), Proceedings of the 2005 IEEE Symposium on Security and Privacy, 2005.*

Ma et al., ("Finding Diversity in Remote Code Injection Exploits"), IMC, Oct. 2006.*

(Continued)

*Primary Examiner* — William Goodchild
(74) *Attorney, Agent, or Firm* — Dan Choi; Carole Boelitz; Micky Minhas

(57) ABSTRACT

A tool and method examine error report information from a computer to determine not only whether a virus or other malware may be present on the computer but also may determine what vulnerability a particular exploit was attempting to use to subvert security mechanism to install the virus. A system monitor may collect both error reports and information about the error report, such as geographic location, hardware configuration, and software/operating system version information to build a profile of the spread of an attack and to be able to issue notifications related to increased data collection for errors, including crashes related to suspected services under attack.

20 Claims, 4 Drawing Sheets

(56) References Cited

U.S. PATENT DOCUMENTS

| | | |
|---|---|---|
| 2006/0200863 A1* | 9/2006 | Ray et al. .................. 726/24 |
| 2007/0074149 A1 | 3/2007 | Ognev et al. |
| 2007/0107060 A1* | 5/2007 | Engle et al. ................ 726/25 |
| 2007/0162975 A1* | 7/2007 | Overton et al. ............. 726/24 |
| 2007/0261112 A1* | 11/2007 | Todd et al. ................. 726/11 |
| 2008/0052773 A1* | 2/2008 | Samprathi et al. .......... 726/13 |
| 2009/0144826 A2* | 6/2009 | Piccard ...................... 726/24 |

OTHER PUBLICATIONS

Ganapathi, et al., "Windows XP Kernel Crash Analysis", Proceedings of the 20th conference on Large Installation System Administration Conference, Date: Dec. 3-8, 2006, 15 Pages: Publisher: USENIX Association Berkeley, CA, USA.

Murphy, et al., "Measuring System and Software Reliability using an Automated Data Collection Process", Date: 1995, 13 Pages, vol. 11, Publisher: Wiley, Chichester, ROYAUME-UNI.

* cited by examiner

IDENTIFYING EXPLOITATION OF VULNERABILITIES USING ERROR REPORT

BACKGROUND

Computer viruses, spyware, other types of malware, and hacker's unauthorized access/use of computer systems have been a problem for many years. Often, a first step in such unauthorized access/use of a computer is to gain a foothold on the target computer via a security vulnerability. The executable code, script, macro, or other technique to gain this initial foothold may be referred to as an exploit, or exploit code. Once the foothold has been accomplished, the actual malware may be installed and executed, although in some cases, the exploit and malware may be the same executable. An industry has developed around detection of viruses, malware, and detection of known techniques for infiltrating computers. Numerous companies deliver virus protection and removal software and firewall products each targeted at identifying known threats and preventing known hacking techniques from infiltrating a computer.

Similarly, operating system and application program vendors are watchful for vulnerabilities that allow hackers and malware authors to gain access to a system. However, hackers and virus authors are both clever and persistent. New exploit code and methods are always being developed and deployed. To date, the only source of information for preventative measures was to analyze successful hacks and determine after the fact how to identify and block attempts or remove results of a previously unknown incursion. However, in some cases, after successfully installing the malware, the exploit code may be 'cleaned up,' to cover the actual vulnerability.

SUMMARY

A tool that analyzes error reports, such as crash dumps and hang reports, allows detection of unsuccessful attempts to subvert a computer's defenses, allowing preventative measures to be implemented before exploit code or an exploit technique can be fine tuned and widely distributed, i.e. "weaponized." A small, but measurable, number of reportable computer errors are due to failed exploit attempts. Exploit attempts are often trial and error procedures and may fail for a number of reasons, including reaching an incorrect memory location, triggering a data execution protection fault, etc. Users will rarely associate an error report with such a failed exploit attempt, so the hacker or exploit writer has other chances to perfect an exploit before the exploit is discovered.

The tool that examines error reports does not simply look for known malware or already-discovered exploit code, but rather looks for evidence of tampering associated with attacks, to determine what area of an operating system or application is being targeted for subversion. Even error reports unrelated to failure of an exploit, for example, an crash related to defective video card, may reveal an exploit or malware. The tool may determine not only the presence of an exploit, but its location and current state. For example, a malware decoder simply in memory may not be as interesting to an investigator as a malware decoder that was being executed when the error report occurred. Decoder loops and other evidence of a hack-in-progress, such as NOPsleds and common types of shellcode, can be detected in an error report, along with evidence of inconsistent control structures or disabled internal defenses. This information can then be used to paint a picture of how the attack was initiated and what vulnerability or potential vulnerability was being targeted.

The tool may also be used to track a hierarchy of the attack so even if an initial infection/security subversion attempt was successful, and subsequent installation of malware was successful, the failure of an attempt to steal a password may cause an error report that leaves a forensic trail back to the original infection/subversion.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
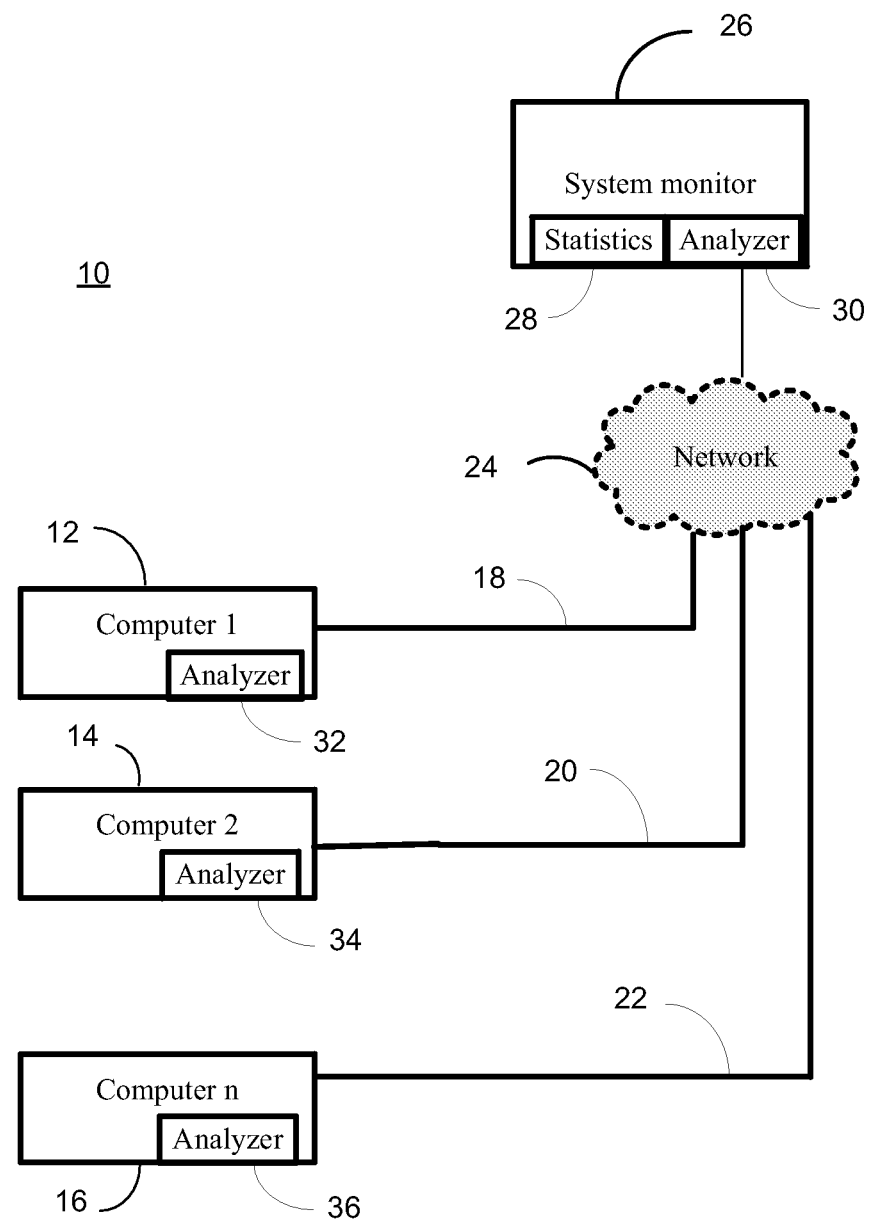
FIG. 1 is a block diagram showing a system-level view of a networked computer environment.

FIG. 1 is a block diagram of a system 10 with a plurality of computers 12, 14, 16. Each of the computers 12, 14, 16 may be connected via respective network connections 18, 20, 22 to a network 24. The network 24 may be a local area network, for example, an enterprise network, or may be a wide area network, such as the Internet.

A system monitor 26 may include a statistics module 28 and an error report analyzer 30, used to analyze error reports received from the plurality of computers 12, 14, 16. In some embodiments, error report analyzers 32, 34, 36 may be located in each computer 12, 14, 16 either instead of, or supplemental to, the error report analyzer 30 in the system monitor 26.

Figure 2:
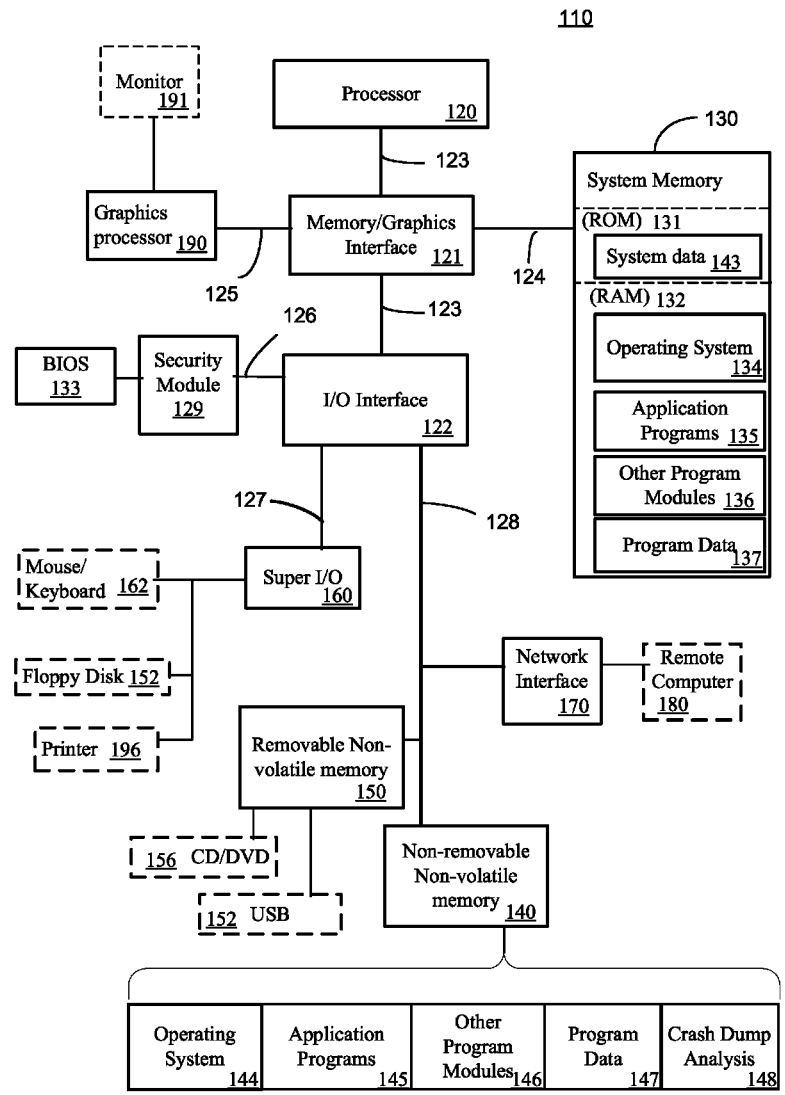
FIG. 2 is a block diagram of showing an electronic device in the form of a computer supporting error report analysis for exploit detection.

With reference to FIG. 2, an exemplary system for implementing the claimed method and apparatus includes a general purpose computing device in the form of a computer 110. Components shown in dashed outline are not technically part of the computer 110, but are used to illustrate the exemplary embodiment of FIG. 2. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 2 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

In some embodiments, a security module 129 may be incorporated to manage metering, billing, and enforcement of policies. The security module is discussed more below, especially with respect to FIG. 5.

A super input/output chip 160 may be used to connect to a number of 'legacy' peripherals, such as floppy disk 151, keyboard/mouse 162, and printer 196, as examples. The super I/O chip 160 may be connected to the I/O interface 122 with a low pin count (LPC) bus, in some embodiments. The super I/O chip 160 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 2 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 2, provide storage of computer readable instructions, data structures, program modules and other data for the computer 110. In FIG. 2, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data

147 are given different numbers here to illustrate that, at a minimum, they are different copies. Some embodiments may include an error report analyzer 148, similar to the error report analyzers 30, 32, 34, or 36 of FIG. 1.

A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 2 may include a local area network (LAN), a wide area network (WAN), or both, but may also include other networks.

In some embodiments, the network interface may use a modem (not depicted) when a broadband connection is not available or is not used. It will be appreciated that the network connection shown is exemplary and other means of establishing a communications link between the computers may be used.

Figure 3:
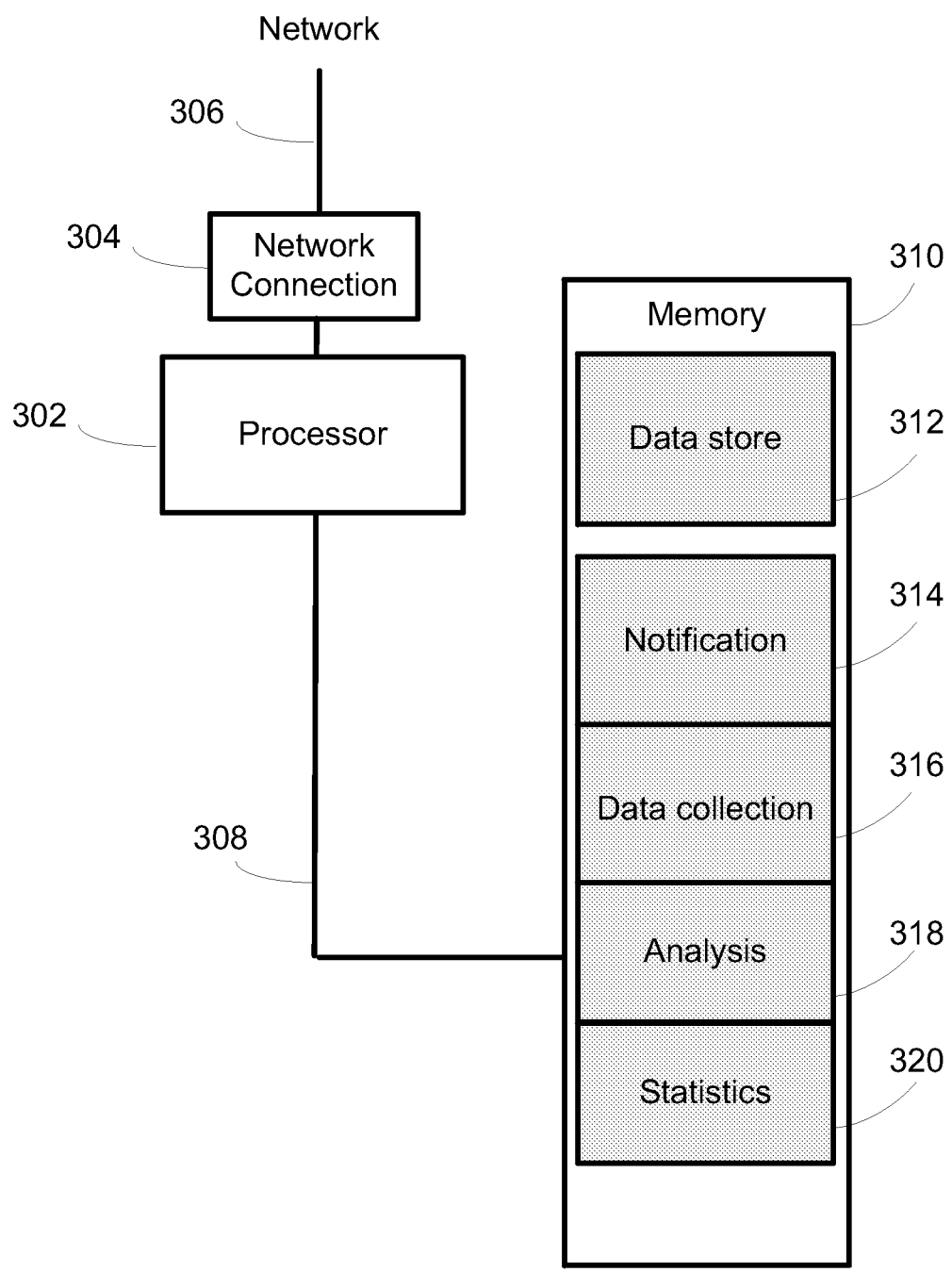
FIG. 3 is a block diagram showing selected portions of a computer similar to that of FIG. 2 in more detail.

FIG. 3 is a block diagram illustrating a logical view of a computer 300 arranged and adapted for analysis of error report files for identifying exploit vulnerabilities. The computer 300 may include a processor 302 coupled to a network connection 304 that enables bidirectional communication with a network 306, such as an Internet Protocol connection to an enterprise network or the Internet. An internal bus 308 may connect the processor, and other peripherals, as necessary, to a memory 310.

The memory 310 may include a data store 312. The data store 312 may store error report data received from other networked computers. The memory may store a number of modules, or computer-executable instructions, that perform specific functions. The memory 310 may include a notification module 314 responsive to an identification of an exploit in a service of one of the other networked computers. The notification module 314 may send a notice to each of the networked computers to change the manner in which each computer collects and forwards error data. The notice may inform each computer to obtain and forward maximal error data in general, or more particularly, error data associated with a particular service. For example, if a pattern of attack is associated with a printer service, the notice may direct additional data collection for printer service-related errors.

After identifying a threat and distributing a countermeasure, e.g. a security patch, a follow-up notice may be issued to reduce data collection for the particular service to a normal level.

The memory 310 may also include a data collection module 316 that may obtain state data regarding the one of the plurality of computers. The state data may include an operating system or patch version. The state data may also include a firewall setting or an intrusion detection setting. This information may be used to determine if an attack profile or susceptibility is present for a particular configuration.

An analysis module 318 may be used to analyze data in the data store 312 for evidence of exploitation. The state data may be included in the analysis. For example, known vulnerabilities in a certain configuration may be taken into consideration when analyzing for an exploit. That is, when a configuration has a known vulnerability, an analysis of that version may confirm whether the exploit was attempting to attack that known vulnerability.

The memory 310 may also have a statistics module 320 that aggregates exploit metadata. Exploit metadata may include information not directly related to the exploit itself. Information such as the location of the computer reporting the error data or information about its configuration may allow a determination of a type of service under attack, a geographic region under attack, or a system configuration under attack.

In operation, the computer 300 may receive error data from any of a plurality of computers, such as computers 12, 14, 16 of FIG. 1, via network connection 304. The processor 302 may store the error data and error metadata in the data store 312. At a convenient time, the error data and metadata may be analyzed using the analysis 318 and statistics 320 modules. Additional information may captured by the data collection module 316 related to state information of the individual computer.

The error data may be crash data related to a failed attack, for example, a data-execute protect error or errant buffer overrun attempt. Alternatively, the error data may be associated with an otherwise benign error, such as an attempt to view a faulty video or network card failure.

In such a case where the error mechanism is a known-benign condition, the error file may be compared with other error files reflecting the same condition to see if differences between the error files/reports show evidence of an otherwise undetected unauthorized condition, even a successfully operational virus or other malware. For example, an error report associated with a known condition, such as a network interface error, may be compared to another previously analyzed report of the condition to see if differences attributable to another unauthorized occurrence may be detected.

Notifications may be sent by the notification module 314 to affect settings for data collection on each of the computers 12, 14, 16, as discussed in more detail below.

Figure 4:
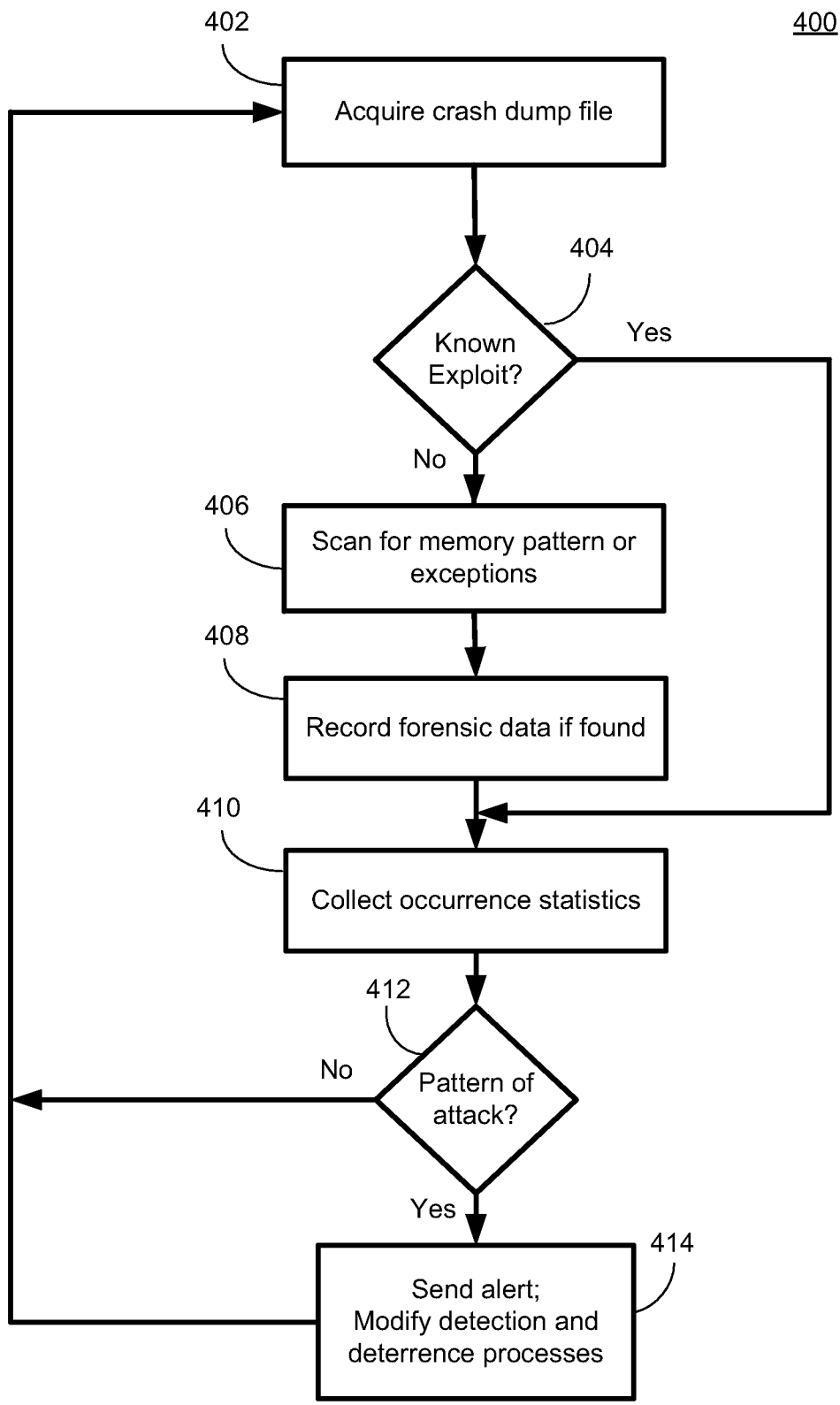
FIG. 4 is a flow chart illustrating a method of examining an error report for exploits.

FIG. 4 illustrates a method of examining an error report for exploits. At block 402, an error report file may be acquired. In one embodiment, error report files may be automatically reported following an unexpected stoppage while in other embodiments, a user may elect to report an error report. In some cases, the error may be of an individual application or service, such as word processor or printer server. In another embodiment, the error may be a crash of the operating system. In some percentage of these errors, the root cause may be a failed attempt to subvert the computer to perform an unauthorized activity. In some cases, the unauthorized activity may be a relatively benign adware, but in other cases, the unauthorized activity may be more malicious, such as using the computer to launch denial of service attacks or capturing bank account numbers and passwords.

When looking for evidence of an exploit, often, the mere presence of undesired code, e.g. a virus, may not be as important as where it is located. For example, a latent virus may not be of particular interest as opposed to a virus that is executing when an error occurs. At block 404, the error report file may be scanned for a known exploit, particularly at a memory location designated for executable code. In some cases, such as a tiered attack, that is, one that first subverts a security tool, then installs a virus, and then uses the virus to compromise information and report it to an attacker. When analyzing the attack, even if the initial exploit may not be immediately obvious, identification of the virus may be used to backtrack from the result to the initial exploit.

That is, a first step in analyzing the data may be to first look for already identified exploits. If the exploit has not already been identified, the 'no' branch from block 404 may be followed to block 406.

At block 406, a scan of the memory may be performed to look for memory patterns or exception data for indications of an exploit or other attempt to subvert a security mechanism. One memory pattern of interest is a NOPSled. Some exploits may attempt get a legitimate program to jump to a memory location containing illegitimate code. However, it is sometimes difficult to exactly predict where the jump may end up. To increase the odds of 'finding' the illegitimate code, an exploit may fill an area of memory around the illegitimate code with a "do nothing" instruction called a NOP (for no operation). Since the NOP instruction is largely a hold over from early programming techniques and is rarely, if ever, used in legitimate programs, a long string of NOP instructions, i.e. a NOPsled, is an indication of an attempted hack. Further investigation into the state of the program counter, to determine what program was actually executing at the time of the error or crash may give an insight into the actual course of the exploit attempt.

Another memory pattern of interest may be a decoder loop. Since firewalls and other defense mechanisms may recognize many common viruses or other malware, a hacker may attempt to code or scramble the virus to get it past the firewall. Once in memory, the virus must be de-scrambled using a decoder loop. Such a decoder loop is a telltale sign of an attempted exploit.

Other memory patterns that may be identified in memory are malicious sequences including malicious text, malicious strings, and malicious binary sequences. As mentioned above, such strings or sequences may be identifiable not so much by their content as by their location. Even though some portions of a data sequence may de-compile into executable instructions, coherent binary code sequences of any length in a data memory are virtually impossible. Therefore, binary code sequences found in a memory designated for data has a high likelihood of being associated with an exploit.

Scanning for exception information may include looking for evidence of a hijacked control structure. For example, a return address on the stack may point to a heap memory instead of a loaded module. In another example of a hijacked control structure an exception handler may point to heap memory or the stack instead of a loaded module. Alternatively a function pointer may be modified to point to a place that's not normal, such as heap memory rather than to a loaded module. Yet another example may be a call stack that has been subverted to return to a different place or with different parameters than originally intended, a so called "return to libc" exploit.

Other exception information may include evidence of a disabled defense program. For example, many processors now support a defense that prevents execution from memory designated as data, rather than that designated as executable memory. When such as mechanism is turned off, that may be evidence of an exploit.

When an error occurs with the program counter in a particular location, that point of attack may be an indicator of the particular vulnerability that is being attacked, such as a printer routine.

At block 408, evidence of an exploit, copies of exploit code, etc. may be recorded as forensic data associated with the exploitation analysis.

At block 410, evidence gathered from a number of samples of error data may be collected, including exploit characteristics and occurrence data. The samples of error data and related metadata may be used to generate statistics for building an attack profile, such as geographic area, hardware configuration, and software or operating system version.

At block 412, if a pattern of attack emerges, the 'yes' branch from block 412 may be taken to block 414. At block 414, a notification may be sent that instructs reporting computers to change the amount, or completeness, of data saved when experiencing errors or crashes related the pattern of attack. The notification may be in the form of a system policy that can govern parameters such as error reporting, response actions, reporting configuration, etc. Such a policy may be sent under the authority of a computer or network administrator, for example, via an Active Directory group policy or Windows™ Update.

Certain patterns of error reporting activity may initiate the policy modifications. For example, an error report from a DMZ server may cause an increase in completeness of error reporting or a network monitor may be instructed to capture all traffic for evidence of an attempted intrusion.

The goal is that increased data will allow an attack exploit to identified so that, ultimately, an effective defense can be deployed against the exploit.

Some examples of modifying an exploit detection and deterrence process on a computer may include setting data collection routines to save all available data from an error report and sending the data to the system monitor. Additional modifications may include scanning and reporting whether an exploit protection mechanism is absent or disabled.

If, at block 412, no pattern of attack is apparent, the "no" branch may be taken to block 402 to continue the analysis process.

Returning to block 404, if the exploit is known, the 'yes' branch may be followed from block 404 to block 410 where metadata about the exploit may be gathered to allow analysis of geographic or version trends, as described above.

Normal virus and intrusion protection software can only detect a threat after it has been successfully deployed and then identified. The tool and method described above allows detection of threats and their intended targets, sometimes even before they have been successfully deployed. This can be a significant benefit not only to the providers of computer hardware and software, but also to their customers, including the end users of such systems. The ability to perform a forensic analysis on error data provides a significant opportunity to move a step closer to more reliable and secure computer systems.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer-implemented method of computer forensics to determine whether an error report contains evidence of an attempted exploit, the method comprising:
   obtaining the error report generated by a computing system and including error data related to one or more errors within the computing system;
   scanning, with a computer processor, the error report for a memory pattern indicative of an unsuccessful attempt to subvert a security mechanism of the computing system;
   scanning, with the computer processor, the error report for exception information indicative of a point of attack within the computing system of the unsuccessful attempt to subvert the security mechanism; and
   recording, with the computer processor, forensic data associated with a result of any of the scanning steps onto a computer-readable storage medium.

2. The computer-implemented method of claim 1, wherein scanning the error report for the memory pattern comprises:
   scanning the error report for a known exploit at an executable memory location.

3. The computer-implemented method of claim 1, wherein scanning the error report for the memory pattern indicative of an attempt to subvert a security mechanism comprises:
   scanning for NOPSleds;
   scanning for decoder loops;
   scanning for other malicious sequences;
   scanning for evidence of a disabled defense; and
   scanning for a data inconsistency between the error report and a known benign condition.

4. The computer-implemented method of claim 3, wherein scanning for malicious sequences comprises
   scanning for one of malicious text, malicious strings, and malicious binary sequences.

5. The computer-implemented method of claim 1, wherein scanning the error report for the exception information indicative of a point of attack comprises:
   scanning for a hijacked control structure; and
   examining exception information for a location of a vulnerability as indicated by a point of attack.

6. The computer-implemented method of claim 1, further comprising:
   reporting one of the error report file and the result of the exploit analysis to a system monitor via a network connection.

7. The computer-implemented method of claim 1, further comprising:
   sending an alert indicating an attack status.

8. The computer-implemented method of claim 1, further comprising:
   one of collecting and generating a network statistic based on exploit characteristic and occurrence data.

9. The computer-implemented method of claim 1, further comprising:
   modifying an exploit detection and deterrence process associated with exploit protection responsive to the result of the exploit analysis.

10. The computer-implemented method of claim 9, wherein modifying the exploit detection and deterrence process comprises:
    setting data collection routines to save extra available data from an error report; and
    sending the extra data to the system monitor.

11. The computer-implemented method of claim 9, wherein modifying the exploit detection and deterrence process comprises:
    scanning to determine whether an exploit protection mechanism is absent or disabled.

12. The computer-implemented method of claim 9, wherein modifying the exploit detection and deterrence process comprises:
    analyzing at the system monitor a collection of error report data from a plurality of computer systems to determine a pattern of exploit.

13. A system for collecting and managing error report data that determines when an attempted exploit has taken place on one or more networked computers, the system comprising:
    a network connection for receiving error report data from a plurality of networked computers, the error report data being related to occurrence of one or more errors within one or more of the plurality of networked computers;
    a data store for collecting the error report data from the plurality of networked computers;
    a notification module responsive to an identification of a successful exploit and to an identification of an unsuccessful exploit in a service of one of the plurality of networked computers that sends a notice to each of the plurality of computers to collect and forward maximal error data associated with the service;
    a data collection module that obtains state data regarding a configuration of the one of the plurality of computers; and
    an analysis module that analyzes the error report data in the data store and state data to produce the identification of the successful exploit, if the exploit is successful, and the unsuccessful exploit, if the exploit is unsuccessful, in the service.

14. The system of claim 13, wherein the state data is one or more of a security update, a firewall setting, and an intrusion detection setting.

15. The system of claim 13, wherein the analysis module examines browser error data from a plurality of machines to determine a common web site indicative of a source of an error trigger.

16. The system of claim 13, wherein the notification module updates settings in an intrusion detection module at least at the one of the plurality of computers and alerts an operator of a possible exploit.

17. The system of claim 13, further comprising a statistics module that aggregates exploit metadata to determine one of a type of service under attack, a geographic region under attack, and a system configuration under attack.

18. The system of claim 17, wherein the type of service under attack is one of a domain name server (DNS) service and a printer server service.

19. A computer-implemented method of performing computer forensics to determine whether an error report contains evidence of an exploit, the method comprising:
    receiving an error report file including error data related to one or more errors within a computing system;
    performing exploit analysis on the error report, even though the exploit was unsuccessful and even when the error report reflects a known-benign error condition, the exploit analysis comprising:
       scanning, with a computer processor, the error report for a known exploit at an executable memory location;
       scanning, with the processor, the error report for a memory pattern indicative of NOPSleds;
       scanning, with the processor, the error report for a memory pattern indicative of a decoder loop;
       scanning, with the processor, the error report for a memory pattern indicative of each of a malicious text, a malicious string, and a malicious binary sequence;

scanning, with the processor, the error report for evidence of a disabled defense program;

scanning, with the processor, the error report for a memory pattern indicative of a hijacked control structure;

examining, with the processor, exception information for a location of a vulnerability that indicates a point of attack; and reporting one of the error report file and the result of the exploit analysis to a system monitor via a network connection.

20. The computer-implemented method of claim 19, further comprising:

receiving an system policy update from the system monitor;

modifying an exploit detection and deterrence process associated with exploit protection responsive to the system policy.

* * * * *